United States Patent [19]

Robeson et al.

[11] Patent Number: 4,600,647
[45] Date of Patent: Jul. 15, 1986

[54] ULTRAVIOLET LIGHT STABILIZED POLYARYLATE CONTAINING ARTICLE

[75] Inventors: Lloyd M. Robeson, Whitehouse Station, N.J.; Claiborn L. Osborn, Charleston, W. Va.

[73] Assignee: Union Carbide Corporation, Danbury, Conn.

[21] Appl. No.: 654,466

[22] Filed: Sep. 26, 1984

[51] Int. Cl.$^4$ .................... B32B 27/36; C08L 67/02; C08K 5/34
[52] U.S. Cl. .................... 428/412; 428/413; 428/451; 428/480; 428/483; 427/54.1; 427/393.5; 525/437; 528/302; 528/308
[58] Field of Search .............. 428/412, 413, 480, 483, 428/451; 528/308, 302; 525/437

[56] References Cited

U.S. PATENT DOCUMENTS 3,317,464  5/1967  Conix .................... 430/533
4,355,071  10/1982  Chang .................... 428/480

FOREIGN PATENT DOCUMENTS 17785  5/1980  Japan .

*Primary Examiner*—P. C. Ives
*Attorney, Agent, or Firm*—Donald M. Papuga

[57] ABSTRACT

Described are ultraviolet light stabilized polyarylate containing articles comprising an article made from a polyarylate coated with a solution of (a) a substituted benzotriazole and a polymer or (b) a substituted benzotriazole.

15 Claims, No Drawings

ULTRAVIOLET LIGHT STABILIZED POLYARYLATE CONTAINING ARTICLE

BACKGROUND OF THE INVENTION

This invention is directed to an ultraviolet light stabilized polyarylate containing article comprising an article made from a polyarylate coated with a solution of (a) a substituted benzotriazole and a polymer or (b) a substituted benzotriazole.

Polyarylates are polyesters derived from a dihydric phenol, particularly 2,2-bis(4-hydroxyphenyl)propane also identified as bisphenol-A, and an aromatic dicarboxylic acid, particularly mixtures of terephthalic and isophthalic acids. The polyarylates are high temperature, high performance thermoplastic polymers with a good combination of mechanical properties. Thus, they are used to mold a variety of articles.

However, after exposure to ultraviolet (UV) light, including sunlight, an article formed from a polyarylate resin has a tendency to turn yellow. In many applications, such as glazing, such yellowing is not acceptable. In various other applications where light shades of colors or certain blue colorants are used, a color shift changing with time occurs, often leading to nonuniformity of color throughout the material.

One method to prevent yellowing has been to use a stabilizer. However, a number of requirements are imposed upon potential stabilizers; they must be compatible with the polymer, they should not adversely effect the mechanical properties of the polymer, they should not be washed out by solvents, they must be stable to actinic light radiation, and they must be stable at the processing temperatures of the polymer. Thus, the choice of stabilizers which meet such requirements is often a difficult problem. Many stabilizers which are commercially available, such as benzotriazole derivatives, are not effective in preventing yellowing of articles molded from polyarylate resins when utilized as an additive.

Korshak et al in Synthesis and Properties of Self-Protecting Polyarylates, Journal of Polymer Science, Part A-1, Vol. 7, pages 157 to 172 (1969) describe a mechanism to explain the color shift of polyarylates when exposed to UV light. The authors propose that polyarylates undergo the Photo-Fries rearrangement resulting in carbonyl and hydroxyl groups ortho to one another, structurally similar to o-hydroxybenzophenones which are known light absorbers. The Photo-Fries rearrangement leads to a color shift (yellowing) on the surface, perhaps to a depth of approximately 0.5 mils. Thus, the polyarylates have increased photostability in the bulk of the material, but the problem of preventing such surface yellowing exists.

In the present invention it has been found that yellowing of an article made from a polyarylate resin can be substantially reduced by coating the surface of the article with (a) a substituted benzotriazole and a polymer or (b) a substituted benzotriazole, normally contained in a volatile organic solvent. This procedure works surprisingly well even though incorporation as an additive is unsuccessful.

THE INVENTION

This invention is directed to a ultraviolet light stabilized polyarylate containing article which comprises an article made from a polyarylate coated with a solution of (a) a substituted benzotriazole and a polymer or (b) a substituted benzotriazole. While benzotriazole derivatives have limited efficiency in preventing a color shift when blended or dissolved in the polyarylate as an additive, it has been found that they are very effective when applied to the surface.

Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

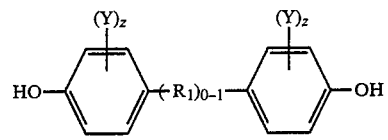

wherein Y is selected from, hydrogen, alkyl groups of 1 to 4 carbon atoms, chlorine or bromine, each z, independently, has a value of from 0 to 4, inclusive, and $R_1$ is a saturated or unsaturated aliphatic hydrocarbon biradical, particularly an alkylene or alkylidene radical having from 1 to 6 carbon atoms, or a cycloalkylidene or cycloalkylene radicals having up to and including 9 carbon atoms, O, $SO_2$, or S. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates of this invention include poly(arylate carbonates) which are produced by reacting a dihydric phenol with an aromatic diacid and a diaryl carbonate, preferably diphenyl carbonate, or carbonyl chloride. The preferred poly(arylate carbonate) is represented by the following structure

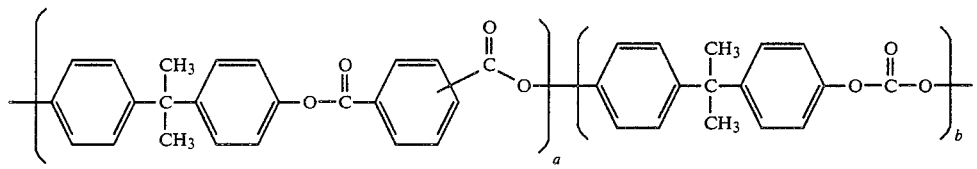

where the tere/iso content can very between 0/100 and 100/0.

Substituted Benzotriazoles

The substituted benzotriazoles which are suitable for use in this invention are of the following formula:

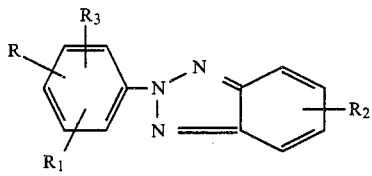

wherein R is $NH_2$, OH, and $C_1$ to $C_{12}$ alkyl and $R_1$ and $R_2$, $R_3$ are independently hydrogen, $C_1$ to $C_{12}$ alkyl or alkoxy, and halogen.

Preferred substituted benzotriazoles include the following:

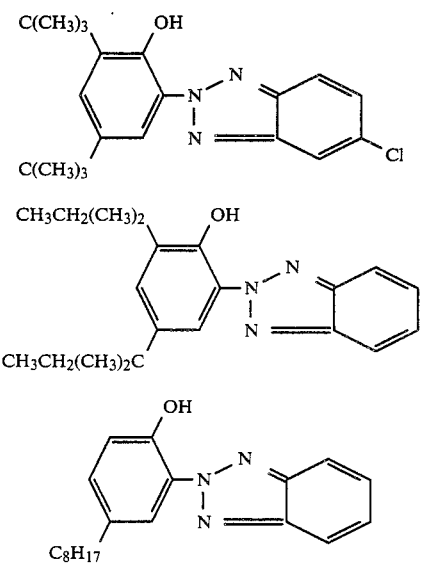

The Coating

The article made from a polyarylate is coated with a solution of (a) a substituted benzotriazole and a polymer or (b) a substituted benzotriazole.

The polymers which may be used include aromatic polycarbonates, such as those derived from bisphenol-A and a carbonyl chloride, polyesters, polyarylates, polyurethane, alkyl acrylate resins such as polymethyl methacrylate, and the like. Besides the thermoplastic polymers, thermosets such as epoxides and polyesters can be considered prior to their crosslinking.

The solvent selected is one in which both the substituted benzotriazole and polymer are soluble. Such solvents include methylene chloride, toluene/methylene chloride mixtures, chloroform, acetone, dimethyl formamide, dimethyl acetamide, tetrahydrofuran and the like.

The coating is applied by techniques well known in the art. The article may even be coated by dipping it into a solution containing the stabilizer. After the article is coated it is dried at a temperature of from 30° to 150° C. depending on the boiling point of the solvent.

The thickness to be coated may vary but is generally between about 0.5 and 3 mils. The concentration of the benzotriazole and polymer, when used, in the solvent is from 2 to about 25 weight percent.

The polyarylate may be used alone to form the shaped article or the polyarylate may be blended with up to 80 weight percent of another polymer such as a polycarbonate, a polyester, particularly poly(ethylene terephthalate), and the like.

It should, of course, be obvious to those skilled in the art that other additives may be included in the blends of this invention. These additives include plasticizers; pigments; flame retardants; reinforcing agents, such as glass fibers; thermal stabilizers; other or additional ultraviolet stabilizers, impact modifiers, and the like.

EXAMPLES

The following examples serve to give specific illustrations of the practice of this invention but they are not intended in any way to limit the scope of this invention.

The following designations are used in the examples and they have the following meaning:

Polyarylate: A polymer having repeat units of the formula:

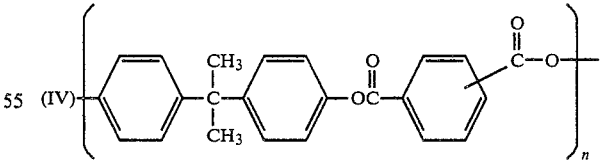

having a reduced viscosity of 0.66 as measured in p-chlorophenol, 0.2 g/100 ml at 49° C. (ARDEL ® D-100 obtained from Union Carbide Corp.) In certain examples different reduced viscosity versions of the same structure were employed. The melt flow results will be noted in these cases.

Stabilizer I: a substituted benzotriazole (Tinuvin 234 obtained from Ciba-Geigy).

Stabilizer II: a substituted benzotriazole of the following formula:

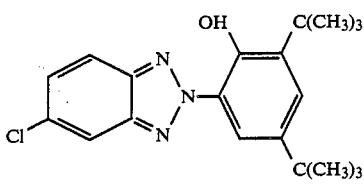

Tinuvin 327 obtained from Ciba-Geigy.
Stabilizer III: a substituted benzotriazole of the following formula:

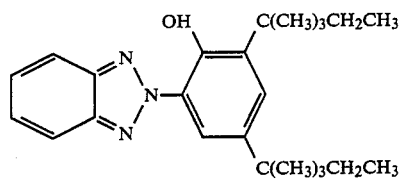

Tinuvin 328 obtained from Ciba-Geigy.

companies. The melt flow of the extruded product was determined in a Tinius-Olsen Melt Index apparatus at 375° C., 44 psi. (As per ASTM D-1238). The melt flow of the control polyarylate was compared with the melt flow of the modified polyarylate. The results are listed below:

TABLE I

|  | Melt Flow (dg/min) 375° C., 44 psi. |
| --- | --- |
| Polyarylate I Control | 16.5 |
| +1% Tinuvin 327 | 66.8 |
| +3% Tinuvin 327 | 233 |
| +1% Tinuvin 770 | 917 |
| Polyarylate II Control | 17.7 |
| +1% Tinuvin P | 81.2 |
| +1% Cyasorb UV-1084 | 89.2 |
| +1% Sanduvor NPU | 788 |
| +1% Irgastab 2002 | 57.9 |
| +1% Cyasorb UV-207 | 160 |
| +1% Cyasorb UV-531 | 56.5 |

In all examples* including the addition of the substituted benzotriazoles, the melt flow results demonstrate

TABLE A

| Trade Name | Class | Chemical Structure |
| --- | --- | --- |
| Tinuvin P | Substituted benzotriazole | (structure shown) |
| Tinuvin 327 | Substituted benzotriazole | (structure shown) |
| Tinuvin 770 | Hindered amine | Not disclosed |
| Cyasorb UV-1084 | Nickel organic | (structure shown) |
| Cyasorb UV-207 | 2-Hydroxybenzophenone | 2-hydroxy-4-methoxy-2'-carboxy-benzophenone |
| Cyasorb UV-531 | 2-Hydroxybenzophenone | 2-hydroxy-4-n-octoxy-benzophenone |
| Sanduvor NPU | Nickel organic | Not disclosed |
| Irgastab 2002 | Nickel organic | Nickel bis[(o-ethyl(3,5-di-t-butyl-4-hydroxy-benzyl)]phosphonate |
| Cyasorb UV-2300 | Aromatic ester | 2,4-di-t-butylphenyl-3,5-di-t-butyl-4-hydroxy-benzoate |
| Cyasorb UV-5411 | Benzotriazole | (structure shown) |

Control A

Two different Polyarylates were extruded at 300° C. with a series of UV stabilizers available from various companies. a serious reduction in molecular weight leading to embrittlement of the polyarylate.

*See Table A for structures

Control B

In order to eliminate the effect of thermal degradation, cast film samples of the Polyarylate were prepared from methylene chloride. Various UV stabilizers were added to the solution and cast films were also prepared for evaluation. The samples were tested for purity* and yellowness index (ASTM D-1925) unexposed and after 500 hour exposure in the XW weatherometer and after 3 months exterior exposure (June, July, August at Bound Brook, N.J.). The results for a Polyarylate (having a melt flow of 18.3 dg/min at 375° C., 44 psi.) and various UV stabilizers are listed in Table 2. The results for a Polyarylate (having a melt flow of 24.5 dg/min at 375° C., 44 psi.) and various UV stabilizers are listed in Table 3. The results clearly show that these additives are not effective in preventing the color shift of Polyarylate exposed to ultraviolet light.

*For a discussion of the definition and determination of purity see G. Wyszecki and W. S. Stiles, "Color Science," John Wiley & Sons, Inc., New York, 1967.

Control D

The procedure of Control C was exactly repeated except that the composition was 60 weight percent of a Polyarylate (having a reduced viscosity of 0.66 as measured in p-chlorophenol at 49° C., 0.2 g./100 ml) and 40 weight percent of poly(ethylene terephthalate) having an intrinsic viscosity of 0.72 as measured in 60:40 phenol/tetrachloroethane mixture at 23° C.

The results are shown in Table 4.

EXAMPLE 1

The procedure of Control C was exactly repeated except that a solution of 5 g of Stabilizer I were dissolved in 50 ml of toluene was brushed on the surface of Control A. The samples were tested by the procedure described in Control C.

The results are shown in Table 4.

EXAMPLE 2

The procedure of Control B was exactly repeated

TABLE 2
EVALUATION OF UV STABILIZERS IN POLYARYLATE

| Sample Description | Initial Data Purity | Initial Data Yellowness Index | After 500 Hours Exposure Purity | After 500 Hours Exposure Yellowness Index | After 3 Months Outdoor Exposure Purity | After 3 Months Outdoor Exposure Yellowness Index |
|---|---|---|---|---|---|---|
| Control Polyarylate | 1.5 | 2.6 | 10.6 | 19.8 | 12.7 | 17.4 |
| +1% Tinuvin 327 | 2.0 | 2.5 | 9.1 | 18.0 | 10.9 | 14.7 |
| +1% Tinuvin 234 | 2.2 | 4.4 | 9.4 | 18.2 | 11.5 | 15.8 |
| +1% Irganox 1425 | 1.4 | 2.7 | 10.9 | 20.4 | 12.9 | 17.4 |
| +3% Irganox 1425 | 1.9 | 4.0 | 11.5 | 21.4 | 13.3 | 17.9 |
| +1% Tinuvin 770 | 1.2 | 2.7 | 11.1 | 20.0 | 12.5 | 17.4 |
| +3% Tinuvin 770 | 1.7 | 2.8 | 11.1 | 20.7 | 12.8 | 18.2 |
| +1.5% Tinuvin 770 +1.5% Tinuvin 327 | 1.7 | 2.6 | 7.5 | 16.3 | 11.0 | 15.4 |
| +1% Sanduvor VSU | 0.9 | 2.4 | 9.9 | 18.7 | 11.3 | 16.8 |
| +1% Tinuvin 328 | 0.9 | 2.8 | 7.6 | 15.9 | 10.4 | 15.2 |

TABLE 3
EVALUATION OF UV STABILIZERS IN POLYARYLATE

| Sample Description | Initial Data Purity | Initial Data Yellowness Index | 500 Hours XW Exposure Purity | 500 Hours XW Exposure Yellowness Index | 3 Months Exterior Exposure Purity | 3 Months Exterior Exposure Yellowness Index |
|---|---|---|---|---|---|---|
| Polyarylate Control | 1.3 | 2.4 | 10.1 | 19.7 | 11.2 | 17.9 |
| +1% Tinuvin 770 1% Tinuvin 234 | 1.3 | 2.2 | 8.6 | 17.5 | 9.8 | 15.2 |
| +1% Cyasorb UV-207 | 1.4 | 2.6 | 9.9 | 19.0 | 10.6 | 16.4 |
| +1% Cyasorb UV-2300 | 1.3 | 2.5 | 10.5 | 19.7 | 11.4 | 17.3 |
| +1% Cyasorb UV-5411 | 1.3 | 2.4 | 8.9 | 17.5 | 9.8 | 14.9 |
| +1% Cyasorb UV-1084 | 2.1 | 3.5 | 12.2 | 21.4 | 12.2 | 18.2 |
| +1% Sanduvor NPU | 2.5 | 5.0 | 12.3 | 23.9 | 8.5 | 20.8 |
| +1% Tinuvin 622 | 2.4 | 2.5 | 10.5 | 19.9 | 11.5 | 17.3 |
| +1% Irgastab 2002 | 2.0 | 3.9 | 10.0 | 20.7 | 12.3 | 18.3 |
| +0.5% Leucopure EGM | 5.2 | 5.7 | 11.3 | 20.5 | 12.3 | 18.7 |

Control C

Polyarylate (having a reduced viscosity of 0.63 as measured in chloroform at 23° C., 0.5 g/100 ml) was compression molded into 20-25 mil thick samples. The yellowness index of the molded specimens was then determined by the procedure of ASTM D-1925-70. The samples were placed in a XW-weatherometer for 500 and 1000 hours and the yellowness index was measured after 500 and 1000 hours. The change in the initial yellowness index and after 1000 hours (ΔYI) was calculated.

The results are shown in Table 4.

except that a solution of 5 g of Stabilizer I were dissolved in 50 ml. of toluene was brushed on the surface of Control B. The samples were tested by the procedure described in Control A.

The results are shown in Table 4.

EXAMPLE 3

The procedure of Example 1 was exactly repeated except that the solvent was methylene chloride instead of toluene.

The results are shown in Table 4.

EXAMPLE 4

The procedure of Example 2 was exactly repeated except that the solvent was methylene chloride instead of toluene.

The results are shown in Table 4.

The results demonstrate that methylene chloride (a solvent for polyarylate) is effective in application of a UV stabilizer whereas toluene (a non-solvent) is not.

The results demonstrate that methylene chloride (a solvent for polyarylate) is effective in application of a UV stabilizer whereas toluene (a non-solvent) is not.

TABLE 4

| Example | Description of Example | Initial Yellowness Index | 500 Hours Exposure Yellowness Index | 1000 Hours Exposure Yellowness Index | ΔYI 1000 Hours |
| --- | --- | --- | --- | --- | --- |
| Control C | PA | 8.9 | 21.5 | 22.6 | 13.7 |
| Control D | PA/PET | 6.5 | 17.1 | 16.8 | 10.3 |
| 1 | PA coated with solution of toluene/Stabilizer I | 8.2 | 12.9 | 22.8 | 14.6 |
| 2 | PA/PET coated with solution of toluene/Stabilizer I | 8.4 | 24.8 | 28.0 | 19.6 |
| 3 | PA coated with solution of methylene chloride/Stablizer I | 12.2 | 15.2 | 13.8 | 1.7 |
| 4 | PA/PET coated with solution of methylene chloride/Stabilizer I | 10.7 | 10.8 | 14.6 | 3.9 |

PA = polyarylate
PET = poly(ethylene terephthalate)

Control E

The procedure of Control C was repeated. Yellowness index measurements were obtained after 500 hours and 750 hours XW weatherometer exposure.

Control F

The procedure of Control D was repeated. Yellowness index measurements were obtained after 500 hours and 750 hours XW weatherometer exposure.

EXAMPLE 5

The procedure of Control E was exactly repeated except that 45 g of a polycarbonate (an aromatic bisphenol A polycarbonate, having a reduced viscosity 0.64 as measured in chloroform at 25° C., Lexan 101 sold by General Electric Co.) and 5 g of Stabilizer I were dissolved in 400 ml of methylene chloride. The solution was brushed onto the polyarylate surfaces and then allowed to devolatilize. The samples were tested by the procedure described in Control E.

The results are shown in Table 5.

EXAMPLE 6

The procedure of Control F was exactly repeated except that 45 g of the polycarbonate of Example 5, and 5 g of Stabilizer I were dissolved in 400 ml of methylene chloride. The solution was brushed onto the polyarylate/PET blend surfaces and then allowed to devolatilize. The samples were tested by the procedure described in Control F.

The results are shown in Table 5.

EXAMPLE 7

The procedure of Example 5 was exactly repeated except that Stabilizer II was used in place of Stabilizer I.

The results are shown in Table 5.

EXAMPLE 8

The procedure of Example 6 was exactly repeated except that Stabilizer II was used in place of Stabilizer I.

The results are shown in Table 5

EXAMPLE 9

The procedure of Example 5 was exactly repeated except that Stabilizer III was used in place of Stabilizer I.

The results are shown in Table 5.

EXAMPLE 10

The procedure of Example 6 was exactly repeated except that Stabilizer III was used in place of Stabilizer I.

The results are shown in Table 5.

EXAMPLE 11

The procedure of Example 5 was exactly repeated except that poly(methyl methacrylate) [VS-100 sold by Rohm & Haas Co.] was used in place of the polycarbonate.

The results are shown in Table 5.

EXAMPLE 12

The procedure of Example 6 was exactly repeated except that the poly(methyl methacrylate) of Example 11 was used in place of the polycarbonate.

The results are shown in Table 5.

TABLE 5

| Example | Description of the Example | Initial Yellowness Index | 500 Hours Yellowness Index | Exposure ΔYI 0-500 | 750 Hours Yellowness Index | Exposure ΔYI 0-750 |
| --- | --- | --- | --- | --- | --- | --- |
| Control C | PA | 9.5 | 20.1 | 10.6 | 23.2 | 13.7 |
| Control D | PA/PET | 6.5 | 17.5 | 11.0 | 17.2 | 10.7 |
| 5 | PA coated with solution of 90/10 Polycarbonate/Stabilizer I | 9.3 | 12.2 | 2.9 | 13.9 | 4.6 |
| 6 | PA/PET coated with solution of 90/10 Polycarbonate/Stabilizer I | 8.1 | 8.0 | −0.1 | 9.7 | 1.6 |
| 7 | PA coated with solution of 90/10 Polycarbonate/Stabilizer II | 9.9 | 8.4 | −1.5 | 9.0 | −0.9 |

TABLE 5-continued

| Example | Description of the Example | Initial Yellowness Index | 500 Hours Yellowness Index | Exposure ΔYI 0-500 | 750 Hours Yellowness Index | Exposure ΔYI 0-750 |
|---|---|---|---|---|---|---|
| 8 | PA/PET coated with solution of 90/10 Polycarbonate/Stabilizer II | 8.5 | 6.8 | −1.7 | 7.0 | −1.5 |
| 9 | PA coated with solution of 90/10 Polycarbonate/Stabilizer III | 8.6 | 9.2 | 0.6 | 10.7 | 2.1 |
| 10 | PA/PET coated with solution of 90/10 Polycarbonate/Stabilizer III | 7.5 | 6.7 | −0.8 | 7.3 | −0.2 |
| 11 | PA coated with solution of 90/10 VS-100 (PMMA)/Stabilizer I | 11.4 | 16.4 | 5.0 | 18.1 | 6.7 |
| 12 | PA/PET coated with solution of 90/10 VS-100 (PMMA)/Stabilizer I | 10.4 | 9.7 | −0.7 | 10.8 | 0.4 |

What is claimed is:

1. An ultraviolet light stabilized polyarylate containing article comprising an article made from a polyarylate coated with a solution of: (a) a substituted benzotriazole and a polymer, or (b) a substituted benzotrizole.

2. An article as defined in claim 1 wherein the polyarylate is derived from a dihydric phenol and at least one aromatic dicarboxylic acid.

3. An article as defined in claim 2 wherein the dihydric phenol is of the following formula:

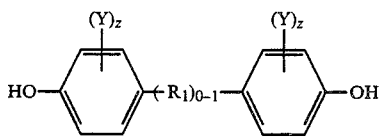

wherein Y is selected from, hydrogen, alkyl groups of 1 to 4 carbon atoms, chlorine or bromine, each z, independently, has a value of from 1 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, $SO_2$, or S.

4. An article as defined in claim 2 wherein the aromatic dicarboxylic acid is isophthalic or terephthalic acids, or mixtures thereof.

5. An article as defined in claim 1 wherein the substituted benzotriazole is of the following formula:

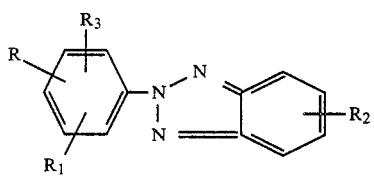

wherein R is $NH_2$, OH, and $C_1$ to $C_{12}$ alkyl and $R_1$ and $R_2$, $R_3$ are independently hydrogen, $C_1$ to $C_{12}$ alkyl or alkoxy, and halogen.

6. An article as defined in claim 5 wherein the benzotriazole is of the following formula:

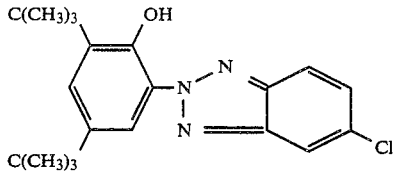

7. An article as defined in claim 5 wherein the benzotriazole is of the following formula:

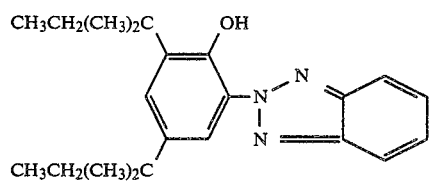

8. An article as defined in claim 5 wherein the benzotriazole is of the following formula:

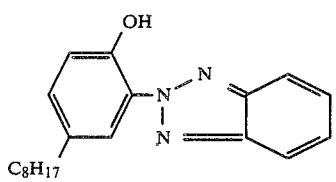

9. An article as defined in claim 1 wherein the polymer is selected from one or more of the following thermoplastic polymers: aromatic polycarbonates, polyesters, polyarylates, polyurethanes, and an alkyl acrylate resin.

10. An article as defined in claim 1 wherein the polymer is a thermosetting polymer selected from polyesters or epoxides.

11. An article as defined in claim 1 wherein the polymer is an inorganic polymer based on a silane precursor.

12. An article as defined in claim 1 wherein the polyarylate contains a polyester.

13. An article as defined in claim 1 wherein the polyarylate contains a polycarbonate.

14. An article as defined in claim 12 wherein the polyester is poly(ethylene terephthalate).

15. An article as defined in claim 1 wherein the polyarylate is a poly(arylate-carbonate).

* * * * *